United States Patent [19]

Finucane et al.

[11] 4,143,170
[45] Mar. 6, 1979

[54] METHOD OF MAKING A NON-FOAMING LOW-CALORIE SWEETENING COMPOSITION

[75] Inventors: Thomas P. Finucane, Hartsdale; Ernest L. Earle, Jr., New City; Alan H. Dworetzky, Tarrytown, all of N.Y.

[73] Assignee: General Foods Corporation, White Plains, N.Y.

[21] Appl. No.: 699,011

[22] Filed: Jun. 21, 1976

Related U.S. Application Data

[63] Continuation of Ser. No. 535,471, Dec. 23, 1974, abandoned.

[51] Int. Cl.² ............................................. A23L 1/22
[52] U.S. Cl. ................................. 426/329; 426/548; 426/658; 426/804
[58] Field of Search ................ 426/329, 548, 658, 804

[56] References Cited

U.S. PATENT DOCUMENTS

| 3,753,739 | 8/1973 | Cella et al. | 426/548 |
| 3,983,251 | 9/1976 | Singh | 426/329 |

Primary Examiner—Jeanette M. Hunter
Attorney, Agent, or Firm—Mitchell E. Alter; Daniel J. Donovan; Bruno P. Struzzi

[57] ABSTRACT

Combining an effective amount of an antifoaming agent with other ingredients of a sugar substitute sweetener by co-spray drying the defoamer with a minor amount of these ingredients such that the defoamer is present in excessive amounts, and thereafter blending the co-dried material with the remaining major amount of the sugar substitute ingredients to bring the concentration back to an effective, but non-excessive amount, results in a bulked low-calorie sweetening composition which is not only readily soluble and non-foaming, but is devoid of any appreciable change in desirable physical characteristics such as density and flowability.

11 Claims, No Drawings

METHOD OF MAKING A NON-FOAMING LOW-CALORIE SWEETENING COMPOSITION

This is a continuation, of application Ser. No. 535,471, filed Dec. 23, 1974 now abandoned.

BACKGROUND OF THE INVENTION

This invention relates to a novel method of incorporating a defoaming agent into a sugar-substitute sweetener. More particularly, it relates to a method of producing bulked sweetening composition having not only the appearance of granulated sugar but also the behavior of granulated sugar in terms of the latters dispersibility in liquid systems and its ability to go into solutions without leaving a slowly disappearing residual foam and film. This desirable result is obtained without an appreciable change in the desirable physical characteristics of the sweetener such as density and flowability despite application of a defoaming agent.

Previous attempts to produce bulked low-calorie sweetening compositions desirably having the appearance of granulated sucrose have involved co-drying, principally spray drying certain artificial sweeteners such as the saccharins and/or cyclamates, or nutritive sweeteners such as dipeptides sweeteners and their salts with edible bulking agents to derive products which possess a bulk density and caloric value per unit of volume considerably less than that of sucrose. Examples of these compounds are taught in U.S. Pat. No. 3,761,288 issued Sept. 25, 1973 and U.S. Pat. No. 3,753,739 issued Aug. 21, 1973 issued to Alberto Culver. This U.S. Pat. No. 3,753,739 teaches spray drying dipeptide sweeteners with starch hydrolysates slurries of which have been separately prepared at specific temperature ranges. Problems have arisen with the use of these spray-dried, low-calorie, bulked compositions since they disperse very slowly in liquid systems, and in particular, leave a slowly disappearing residual foam and film on the surface of such systems. This leaves an unattractive product characteristic which would significantly reduce consumer acceptance of the sweetener as a sugar substitute.

SUMMARY OF THE INVENTION

It has been found that the dispersibility of bulked, low-calorie sweetening compositions may be significantly increased, their tendency to leave a slowly disappearing residual foam eliminated, and most notably, their desirable physical characteristics such as density and flowability retained by co-spray drying a minor amount of the low-calorie sweetener and edible bulking agent with an excessive amount of a defoaming agent such that when the co-dried material is blended with the major residual amount of the co-spray dried sweetener and bulking agent, the defoamer is present in effective, but non-excessive, amounts. The method of this invention may be accomplished both by co-spray drying all of the defoamer with the minor amount of bulking agent and sweetener as well as co-spray drying a major amount of defoamer with the same and co-spray drying the minor non-effective amount of defoamer with major amounts of the bulking agent and sweetener. However, mainly for ease of processing, the former method is preferred and reference will henceforth be made principally to that method.

Heretofore, the conventional methods of applying a defoaming agent to a dry material having a tendency to foam in solution principally have been to either spray the defoaming agent onto the dry material or co-dry all of the defoamer with the material uniformly, i.e. co-dry the defoamer with all of the material in the same drying step. While in the latter instance, the defoamer is effectively fixed to the material resulting in an appreciable decrease in foaming properties, the density of the dried material is increased to such an extent as to make it undesirable for use in a wide variety of products. Similarly, in the case of spraying the defoamer onto the already dried material, the density of this material is not only increased, but the material is sticky to the touch due to the defoamer not having been fixed into the material itself. In contradistinction, the method of this invention results in minimal changes in the products' physical characteristics, such as density, flowability, etc. as compared to the aforementioned methods of applying defoaming agents. Yet, the same desirable anti-foaming affect is derived due principally to the fixation of the defoamer in but a minor amount of the material to be treated.

The bulking agents which may be employed in this invention may be any of the non-toxic substances or combination of substances heretofore employed by the prior art for this purpose including the organic acids such as citric, adipic, fumaric acids, and the hydrolyzed starch materials such as dextrins, polymerized dextrins such as polymaltose, including polyglucose, and sugars. Especially suitable among these solid bulking agents are the dextrins of the class commonly known as corn syrup solids. With certain of these materials, it is possible to produce a low-calorie, low-bulk density, non-hydroscopic sweetening composition which has the appearance of table sugar and which will dissolve readily in cold water. This latter class of bulking agents differs from the previously mentioned acidic bulking agents, however, in that they are usually dried to obtain the desired bulk. The acids, on the other hand, do not require added bulking procedures and are used, "as-is" to impart the desired bulk density. In the former instance, the surface area is often increased so significantly that the product tends to "raft" on the surface of liquids into which they are incorporated. Therefore, this invention finds particular significance where the hydrolyzed starch materials are employed.

The defoaming agents which may be employed in this invention are those preferably which have been approved for use in foods such as the dimethyl polysiloxanes, copolymers of dimethyl siloxane, silicon dioxide and the like, dimethyl polysiloxane being preferred.

The low-calorie sweeteners which may be employed are any of the well-known sweeteners such as saccharin, soluble salts of saccharin, cyclamate, soluble salts of cyclamate, L-aspartic acid derivative sweeteners, preferably dipeptide sweeteners and their salts such as L-aspartyl-L-phenylalanine methyl ester and combinations thereof, all of which have been found to foam when combined with an appropriate bulking agent and incorporated into liquid systems. The soluble salts of the dipeptide sweeteners such as the hydrohalide salts, for example L-aspartyl-L-phenylalanine methyl ester hydrochloride, the organic salts such as L-aspartyl-L-phenylalanine methyl ester citrate and the inorganic salts such as the sodium, potassium and ammonium salts of L-aspartyl-L-phenylalanine methyl ester are particularly preferred since they are rapidly soluble in aqueous systems and are devoid of any unpleasant aftertaste as is evident when a saccharin or cyclamate is employed. In addition, these sweeteners may also be combined with a sugar to give non-foaming bulked sweeteners having higher caloric contents than when a sugar is not present.

It is an object of this invention, therefore, to produce readily dispersible bulked, low-calorie sweetening compositions which are not only devoid of foam and any tendency to leave a residual film on a beverage surface, but most importantly, retain their desirable physical properties such as density and free flowability.

DESCRIPTION OF THE INVENTION

According to one embodiment of this invention, a table sugar substitute having the appearance and behavior of crystalline sucrose may be prepared by forming a uniform aqueous solution of a minor amount of a corn syrup dextrin material and dipeptide sweetening agent, and an excessive amount of a defoaming agent such as the presently food-approved dimethyl polysiloxanes. The term "excessive amount" is to be construed as amounts present which exceed the level necessary to obtain an antifoaming effect in the minor amount of material with which it is co-dried. The treated dry minor amount of sweetener is thereafter dry blended with the major amount of similarly dried but untreated material to bring the level of defoamer basis the final dry sweetening composition to an effective, but non-excessive, amount. For example, this often means that for a crystalline sugar-type product the defoamer is added to the minor amount of bulking agent and sweetener to the extent of about 150 parts per million of the active ingredient (10% by weight of defoamer) based on the as-is weight of the total final bulking agent and sweetener; water is added to bring the final solids concentration to about 50%. Amounts of defoamer in excess of 150 ppm, for example, as high as about 1500 ppm, may be employed but have been found to be unnecessary.

The materials are preferably dissolved with agitation at a temperature of up to about 150° F., to obtain a homogeneous solution which is then co-dried as by spray drying concurrent with heated air usually in a vertical cylindrical spray tower equipped with a separate dust collector. The co-dried product is then combined with untreated bulked sweetener to bring the final level of defoaming agent to an effective, but non-excessive, amount. Currently, where dimethyl polysiloxane is used, the concentration of defoamer has been restricted for use in foods to no higher than 10 parts per million (1% by weight of defoamer) in the dry composition or at such levels in a concentrated food that when prepared as directed on the label the food in its ready-for-consumption state will not have more than 10 ppm defoamer. The only exception is where the sweetener composition is to be employed in a gelatin or gelatin dessert type system. In this instance the final concentration of defoamer may be as high as 110 ppm in the dry gelatin dessert mix whereby no more than 16 ppm is present in the ready to serve dessert.

The final dry product may be, and preferably is, mixed with a flow agent such as tricalcium phosphate to improve the flow characteristics of the final dry composition, the level of tricalcium phosphate usually averaging about 0.1% basis the final dry product.

The initial product which is treated according to the method of this invention is preferably L-aspartyl-L-phenylalanine methyl ester or a soluble salt thereof in combination with a dextrin having a DE in the range of about 4 to 20, preferably in the range of about 5 to 10 and a dimethyl polyxiloxane present to the extent of about 150 ppm of active ingredient (10% by weight of defoamer) based on the as-is weight of the low DE dextrin and L-aspartyl-L-phenylalanine methyl ester sweetener. The best results are obtained if the dextrin material contains little or no monosaccharide (i.e. glucose) and contains an irregular distribution of the other lower (1-8 saccharide units) saccharides with a preponderance of the heptamer and hexamer. Such dextrins have been produced by means of enzymatic hydrolysis of starch and are typified by the products available from Corn Products Corporation under the name "MOR-REX." The mixture may be spray dried in accordance with the skill and practice of the prior art to any desirable bulk density. For a sweet, dry, low-calorie, bulked product this usually means that the composition of the present invention will have a bulk density of from about 0.04 g/cc to about 0.3 g/cc and where a dipeptide sweetener is employed, a respectively proportionate dipeptide sweetener concentration, specifically L-aspartyl-L-phenylalanine methyl ester or a soluble salt thereof, of about 9.5% to about 1.2%. However, where a product most like sucrose in terms of volume and the sweetness intensity associated therewith is desired, the final bulk density is preferably in the range of about 0.12 g/cc to about 0.18 g/cc with a respective L-aspartyl-L-phenylalanine methyl ester or soluble salt thereof concentration of about 4.7% to about 3.1% respectively where the relative sweetness intensity of this dipeptide is regarded as being 150 times that of sucrose. Where the relative sweetness of the same dipeptide is viewed as being 200 times that of sucrose, the respective percent dipeptide required for a sweetness level equivalent to sucrose on an equal volume basis is from about 3.5% to about 2.3%.

The distinguishing feature of this invention is not the application of a defoaming agent to a bulked low-calorie sweetening composition, but rather is the unique sequence in which the defoamer is thereto applied such that a totally new and unexpected result is obtained. The salient point of this invention is co-drying an effective amount of defoaming agent basis the total bulked sweetening composition into only a minor amount of the bulking agent and low-calorie sweetener and blending the co-dried minor amount of treated bulked sweetener with the remaining major amount of similarly dried, but untreated, bulked sweetener. Incorporation of the relatively small quantity of spray dried component with defoamer to the bulked, spray-dried sweeteners without defoamer achieves effective defoaming with a minimum change in density. Specifically, this special application of the defoamer to the bulked sweetening compositon has the advantage of minimizing changes to the product's physical characteristics; namely, preventing the dry composition from becoming sticky which often occurs when a defoaming agent is sprayed onto the spray-dried composition rather than being directly spray dried therewith, and retains more of the characteristic flowability and density of the bulked composition which is normally adversely affected by conventional methods of applying a defoaming agent to a spray-dried product.

The processes of this invention are further illustrated, but not limited, by the following examples.

Three bulked, low-calorie sweetening compositions were prepared in order to evaluate two levels of defoamer (dimethyl polysiloxane). The control (A) contained no defoamer while samples B and C contained 150 and 1500 ppm defoamer respectively on a product basis which is equivalent to 10 ppm and 100 ppm on the anticipated as-used basis. The sweetener employed was L-aspartyl-L-phenylalanine methyl ester, hereinafter referred to as APM.

| Ingredient | A | B | C |
|---|---|---|---|
| 10 DE Dextrin (% by weight) | 96.50 | 96.36 | 95.12 |
| APM (% by weight) | 3.50 | 3.50 | 3.45 |
| Defoamer* (% by weight) | 0.00 | .14 | 1.43 |
| Active Ingredient: | | | |
| ppm product | | 1,430.0 | 14,330.0 |
| ppm as used | | 10.0 | 100.0 |

*Active ingredient is 10% and, therefore, a solids content of 10% is assumed.

To each dry system was added a sufficient amount of water to bring the final solids content to 50%, the water present in the defoamer being accounted for.

The drying conditions for each system were generally an air inlet temperature of about 410° F., an air outlet of between about 235° to 238° F., a feed concentration of about 50% plus or minus about 0.5% and a feed temperature of about 153° F. to about 158° F. The densities obtained were as follows:

| | A | B | C |
|---|---|---|---|
| Without TCP | 0.123g/cc | 0.165g/cc | 0.169g/cc |
| With TCP | 0.197g/cc | 0.227g/cc | 0.214g/cc |

The flowability was further improved where 0.1% tricalcium phosphate was added. Samples B and C were then dry blended with sufficient amounts of spray-dried untreated APM/dextrin to bring the defoamer concentrations to 10 ppm and 100 ppm respectively.

12 gms of instant coffee were dissolved in 1000 mls water with a handling temperature of 160° F. and 235 ml of coffee thereafter poured into each of 3 containers to simulate a typical cup of coffee. One level teaspoon of each sample was evaluated separately when placed in the coffee, each sample undergoing identical stirring conditions.

The following results were derived:
Sample A
Foams initially, slight clumping on surface, foam persists.
Sample B
Slight initial foam, dissolved more quickly than Sample A, slight initial clumping, no persistent foam or film.
Sample C
Slight initial foam, dissolved more quickly than Sample A, but not as rapidly as B; no persistent foam or film.

These systems were also evaluated under the same conditions in roast and ground coffee (R + G). The differences between the performance of B and C were less pronounced as in the soluble coffee evaluations.

9 gms of Sample A and 1 gm of Sample C both of Example I were dry blended. One level teaspoon of this blend was evaluated in both soluble and "R + G" coffee according to the method of Example I. This mixture dissolved readily with stirring and, although there was some initial sheeting of the bulked, low-calorie sweetener, there was no foam or persisting film on either of the coffee surfaces.

Where the density of Sample A was 0.123g/cc prior to being combined with Sample C, the final density of the combination was only 0.135g/cc representing an insignificant change in density contra to what would be expected if conventional methods of incorporating a defoamer were employed.

Having described the invention, what is claimed is:

1. An improved method for producing a readily dispersible, non-foaming, low-calorie bulked sweetener composition comprising a co-dried edible bulking agent, and a low-calorie sweetening composition which contains an effective amount of a defoaming agent so as to retard foaming and a sweetening agent selected from the group consisting of saccharin, cyclamates, and L-aspartic acid derivatives, and combinations thereof, comprising the steps of
   (a) forming a first sweetening solution of a minor amount of an edible bulking agent, and an amount of defoaming agent greater than or equal to the effective amount to retard foam basis the total bulk sweetening composition, and a sweetener selected from the group consisting of saccharin, cyclamates, and L-aspartic acid derivatives and combinations thereof;
   (b) spray drying the first sweetener solution;
   (c) forming a second sweetening solution containing a major amount of the edible bulking agent, and a quantity of defoaming agent from 0 to less than effective amount to retard foaming and a sweetener selected from the group consisting of saccharin, cyclamates, and L-aspartic acid derivatives and combinations thereof;
   (d) spray drying the second sweetening solution;
   (e) blending the spray dried first and second dried sweetening solutions to derive a total bulked sweetening composition containing an effective amount of defoaming agent to retard foaming and having minimal change in density and flowability compared to bulked sweetening compositions wherein all defoaming agents, sweetening agents, and bulking agents are dried together.

2. The method of claim 1 wherein all of the defoaming agent is co-spray dried with the minor amount of bulking agent and low-calorie sweetener.

3. The method according to claim 1 wherein the bulking agent is corn syrup solids having a DE within the range of about 4 to about 20.

4. The method of claim 3 wherein the DE is within the range of about 5 to about 10.

5. The method of claim 2 wherein the low calorie sweetening compound is a dipeptide sweetener.

6. The method according to claim 5 wherein the dipeptide sweetener is L-aspartly-L-phenylalanine methyl ester.

7. The method according to claim 1 wherein the defoaming agent is a dimethyl polysiloxane.

8. The method according to claim 1 wherein the final product is mixed with tricalcium phosphate to the extent of about 0.1%.

9. The method of claim 1 wherein the final bulk density is from about 0.12 g/cc to about 0.18 g/cc.

10. The method of claim 9 wherein the sweetening compound is a dipeptide sweetener present at a concentration of about 4.7% to about 3.1% based on the respective bulk density of the final product where the relative sweetness intensity of the dipeptide is considered to be 150 times the sweetness of sucrose.

11. The method of claim 9 wherein the sweetening compound is a dipeptide sweetener present at a concentration of about 3.5% to about 2.3% based on the respective bulk density of the final product where the relative sweetness intensity of the dipeptide is considered to be 200 times the sweetness of sucrose.

* * * * *